United States Patent [19]

Collin et al.

[11] Patent Number: 4,722,533
[45] Date of Patent: Feb. 2, 1988

[54] ROTARY, FLAT METALLIC FLUID-TIGHT AND THRUST-RESISTING SEAL AND THE METHOD OF MANUFACTURE THEREOF

[75] Inventors: Claude G. E. Collin, Ponthierry; Guy M. Desmat, Bois le Roi; Roland E. Legoff, Montgeron, all of France

[73] Assignee: Societe Nationale d'Etude et de Constructions de Moteur d'Aviation "S.N.E.C.M.A.", Paris, France

[21] Appl. No.: 29,941

[22] Filed: Mar. 26, 1987

[30] Foreign Application Priority Data

Mar. 26, 1986 [FR] France ................. 86 04337

[51] Int. Cl.⁴ .................. F16J 15/34; B24B 23/02
[52] U.S. Cl. ...................... 277/1; 277/96.1; 277/134; 51/281 SF
[58] Field of Search ........... 51/281 R, 281 SF, 327; 277/1, 96, 81 R, 96.1, 134

[56] References Cited

U.S. PATENT DOCUMENTS

| | | | |
|---|---|---|---|
| 2,136,036 | 11/1938 | Avery | 51/281 SF |
| 2,367,850 | 1/1945 | Dusevoir . | |
| 3,744,805 | 7/1973 | Heinrich | 277/96.1 |
| 3,796,466 | 3/1974 | Lasch . | |
| 4,361,988 | 12/1982 | Gramlich | 51/281 SF |
| 4,420,162 | 12/1983 | Yanai et al. | 277/234 X |
| 4,444,399 | 4/1984 | Yanai et al. | 277/1 |
| 4,525,957 | 7/1985 | Daniels . | |

FOREIGN PATENT DOCUMENTS

| | | |
|---|---|---|
| 0013678 | 8/1980 | European Pat. Off. . |
| 2188765 | 1/1974 | France . |
| 2494380 | 5/1982 | France . |
| 58-109771 | 6/1983 | Japan . |
| 6402052 | 8/1965 | Netherlands . |
| 2054420 | 2/1981 | United Kingdom . |

Primary Examiner—Robert S. Ward
Attorney, Agent, or Firm—Oblon, Fisher, Spivak, McClelland & Maier

[57] ABSTRACT

In the process for the machining of a rotary flat fluid-tight seal by grinding, the working surface of the grinding wheel has imparted to it an inclination with respect to the annular surface of the seal, in such a manner as to leave behind on the said surface of the seal traces which are termed "in half-sun" at the intersection of the grinding wheel and of the seal along a chord. The inclination is provided by modifying the height of one of two headstocks of a grinding machine and by pivoting the table of the grinding machine in a horizontal plane. The fluid-tight seal thus produced provides a leakage flow of lubricating fluid and thus can be used as an axial thrust seal and bearing of a rotary shaft, especially for pumps.

6 Claims, 20 Drawing Figures

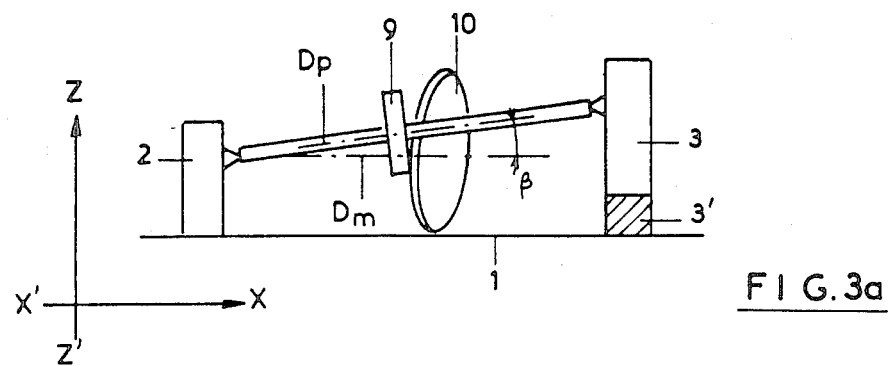
FIG. 3a
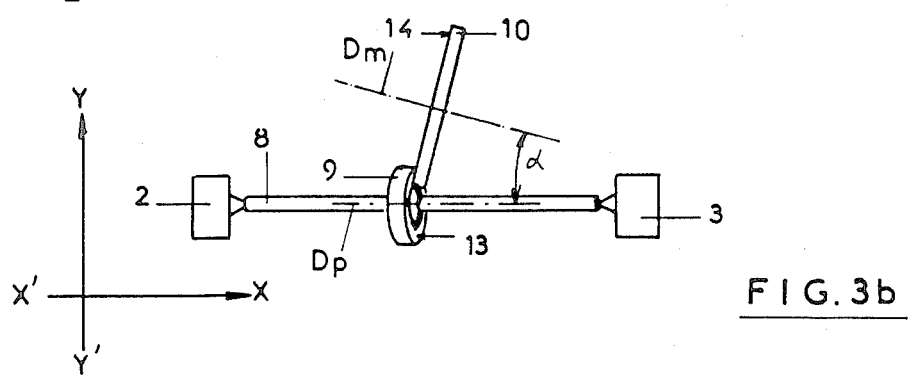
FIG. 3b
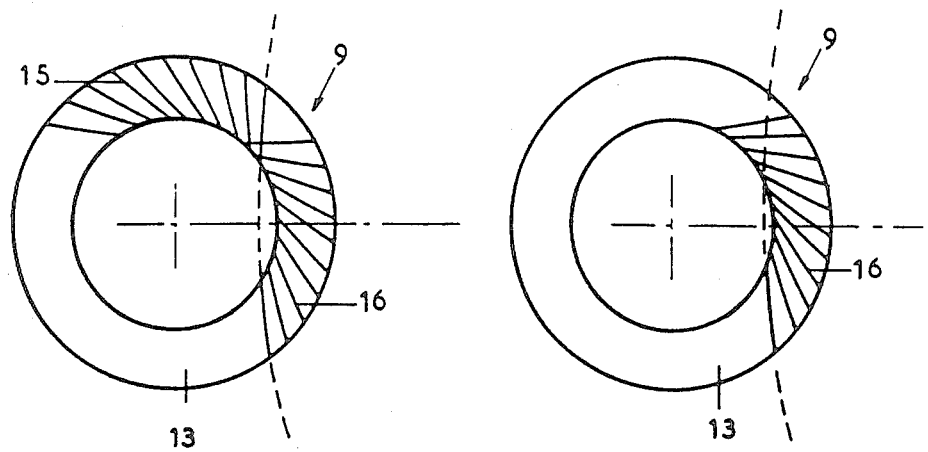
FIG. 4
FIG. 5

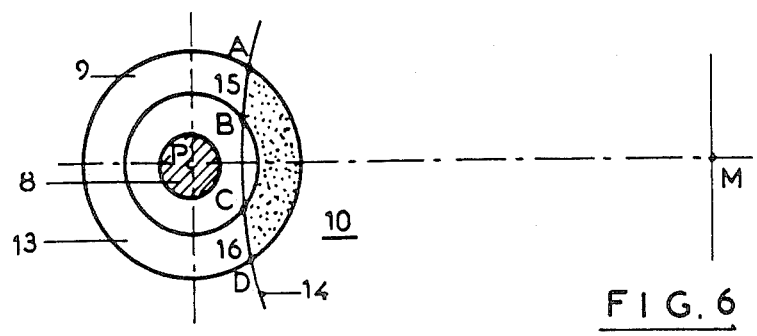
FIG. 6
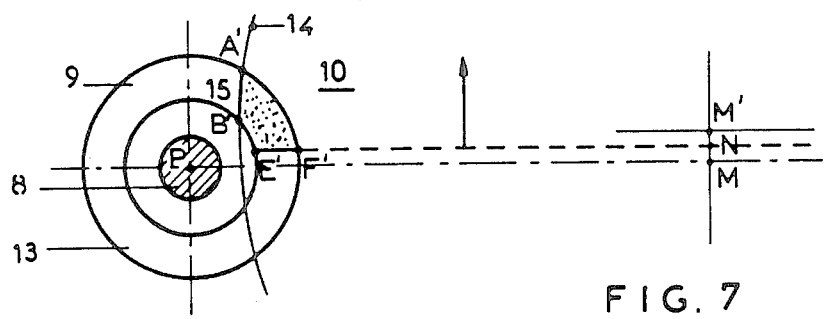
FIG. 7
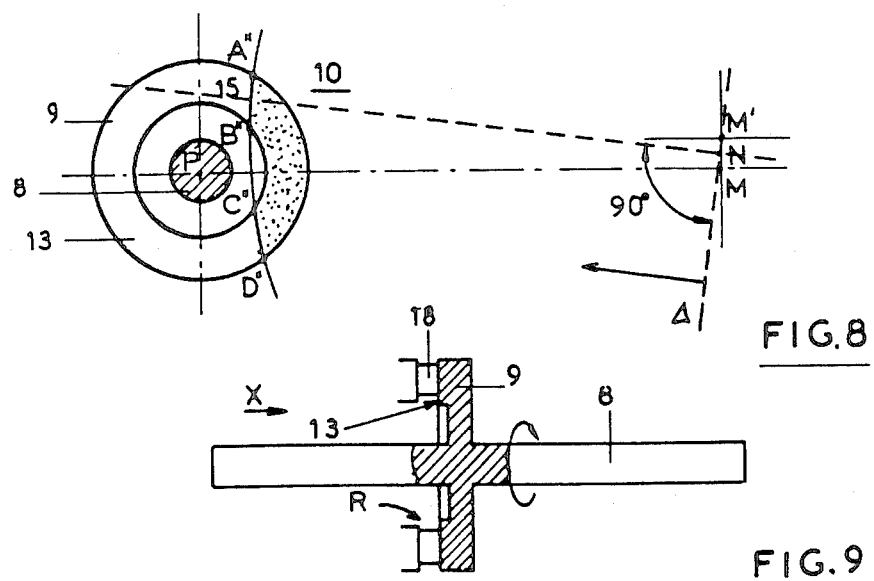
FIG. 8
FIG. 9

ROTARY, FLAT METALLIC FLUID-TIGHT AND THRUST-RESISTING SEAL AND THE METHOD OF MANUFACTURE THEREOF

BACKGROUND OF THE INVENTION

1. Field of the Invention

This invention relates to a rotary, flat metallic fluid-tight and thrust-resisting seal and to a method of manufacturing such a seal.

2. Summary of the Prior Art

It is necessary in certain machines such as pumps, to provide fluid-tight axial thrust seals for a rotary shaft.

It is not known at the present time how to produce a rotary, flat, seal capable of simultaneously ensuring fluid-tightness in an efficient manner and resisting, over a long period, heavy loads. In order to provide for fluid-tightness, it is possible to imagine that the seal is constituted by two annular plane smooth faces one applied against the other. However, under the action of the axial load and of the rotation in the absence of lubrication, this would give rise to heating up which would rapidly lead to deterioration of the contacting members. It is therefore essential to lubricate the contact surfaces by causing the circulation of ambient fluid under pressure between the two faces. If the two faces are perfectly polished, fluid cannot circulate correctly and friction will be generated. Since it is necessary to have in this location between the faces a fluid film, it is necessary to machine at least one of the two faces so that it maintains the traces of the machining which are able to distribute the fluid over the whole surface. Unfortunately, known machining methods (cylindrical face grinding) leave the surface in a condition which will certainly result in good lubrication but also ambient fluid flow which is uncontrollable and is often excessive.

It is for this reason, in present day practice, that generally the functions of resistance to thrust loads and of fluid-tightness are provided separately, as follows. A lubricated thrust bearing which is not fluid-tight (with faces machined traditionally) is followed by a fluid-tight seal having no load of consequence to resist and made by means of two plane and lapped surfaces, the one of steel, the other of graphite, for example.

An object of the invention is to provide a rotary flat seal serving simultaneously the two functions of fluid-tight and of thrust resistance without giving rise to the disadvantages referred to.

SUMMARY OF THE INVENTION

According to the present invention there is provided a method of machining a rotary, plane, metallic seal comprising the steps of grinding a plane annulus of the seal by means of a plane, lateral working surface of a circular grinding wheel which working surface cuts the annulus along two chords, the working surface being inclined with respect to the annulus so that their planes intersect along a line substantially parallel to one of the selected two chords and that the maximum penetration by the working surface into the annulus is located substantially at the center of the said chord, the grinding effected at this location only producing traces termed herein as "in half sun" by the said one chord and imparting to the annulus the required flatness.

In accordance with the present invention the relative positions of the annular surface or annulus and of the working surface of the grinding wheel are modified so that the action of the working surface only affects a single chord and that the work carried out in the region of the chord concerned leads to a machined surface which is still plane (or at least substantially plane) and is not conical.

More specifically, in accordance with the method of the invention, the working surface of the grinding wheel is inclined with respect to the annular surface so that their planes intersect on a substantially parallel line and at the selected one of the two chords and that the maximum penetration of the working surface into the annular surface will be situated approximately at the centre of this chord, so that the grinding carried out in this position only permits the existence of traces termed herein "in half sun" produced by the selected chord and gives to the annular surface an excellent degree of flatness.

It will be clear that the relative specific arrangement set out between the annulus and the working surface can be effected by any equivalent displacement of the one and/or the other surface.

For understanding of the method, it is desirable to start from the conventional disposition for grinding then to depart from this by a simple displacement in order to arrive at the required disposition in accordance with the invention. However, the explanation which will follow is only intended to describe relative orientations of the two surfaces involved. In practice, the traditional rules of approach between the part to be machined and the grinding wheel must be respected, here more particularly, since it is not desired to penetrate deeply into the part to be machined but, on the contrary, merely to touch it. The annular surface or annulus is initially located in the plane of the working surface of the grinding wheels and, for references, this plane and the upright line in which the common diameter of the two surfaces lies in this position are used, then the annulus is displaced by a first rotation through a small angle $\beta$ about an axis parallel to the reference upright line, then by a second small rotational angle $\alpha$ about an axis parallel to the reference plane and perpendicular to the upright line reference.

In practice, the shaft carrying the annular fluid-tight seal is initially mounted horizontally between two headstocks rigid with the table of a grinding machine, parallel to the axis of the grinding wheel and in the same horizontal plane, the angle of rotation $\beta$ is provided by modifying the height of one of the two headstocks and the angle of rotation $\alpha$ by pivoting of the table of the grinding machine in its horizontal plane.

The angle $\beta$ is of the order of several minutes and the angle $\alpha$ is about six times larger depending upon the dimensions of the part and of the grinding wheel, but it will be apparent that the operator can select them over a large range, while still observing the principles of the invention.

Thus according to the invention, the traces obtained are only those of a single coherent system (these traces being termed herein "in half sun"). The traces are disposed and act as the blades of the impeller of a centrifugal or centripetal pump depending upon the chord selected and the sense of rotation of the shaft and it enables the control and even the reversal of the flow of leakage fluid in the region of the seal.

BRIEF DESCRIPTION OF THE DRAWINGS

FIGS. 1a, 1b, 2a, 2b, 3a, 3b are diagrammatic views, each pair of Figures being respectively in elevation and in plan, of a series of grinding devices at three settings in accordance with the invention, FIGS. 4 and 5 diagrammatically show a ground rotary fluid-tight seal and exhibiting respectively traces "in sun" according to the prior art, and "in half sun" according to the invention, FIGS. 6, 7, 8 are fragmentary diagrams of a series of the grinding wheels of FIGS. 1 to 3, as seen substantially on end, perpendicularly to the plane of the seal and only indicating respective positions of the seal and of the grinding wheel, FIG. 9 is a diagram illustrating the use of a seal machined according to the method in accordance with the invention.

DESCRIPTION OF THE PREFERRED EMBODIMENTS

Figure 1A:
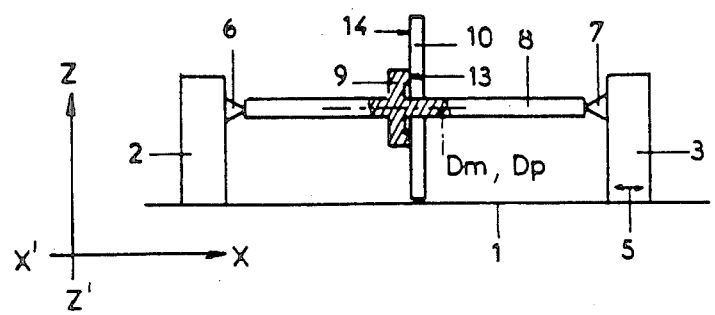
Figure 1B:
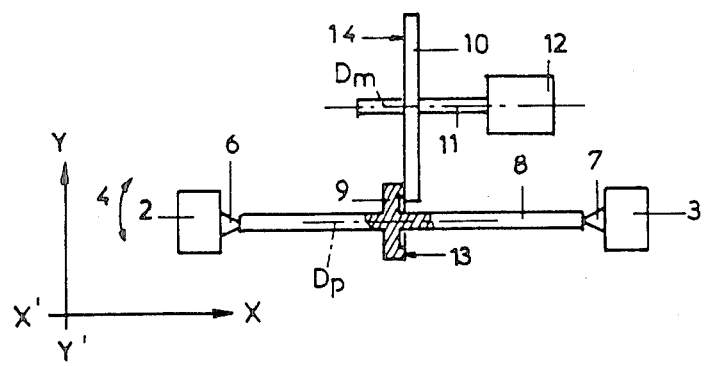

It will be apparent that FIGS. 1a and 1b illustrate a grinding assembly of type known in itself comprising a horizontal table 1 normally angularly adjustable in the sense of the double arrow 4, a fixed headstock 2, and an adjustable headstock 3 normally adjustable axially in the sense of the double arrow 5.

A shaft 8 is mounted between a center 6 and a contra-center 7 and can be rotated in the conventional manner. A shaft 8 carries the flat annular seal 9 to be ground.

The grinding wheel 10 is keyed on a shaft 11 driven by a motor 12 (illustrated only in FIG. 1b).

It is convenient to note that FIGS. 1 to 3 are diagrammatic and do not take into account the relative dimensions of the different elements. They are intended principally to give a good understanding of their relative disposition.

FIGS. 1a and 1b show the traditional arrangement of a grinding assembly, which may serve as a point of departure for understanding the arrangements in accordance with the invention.

The direction of advance of the surface to be machined of the part 9 towards the working surface of the grinding wheel will 10, will be designated x'x, the direction of control of the distance between the axis of the part 9 and the axis of the grinder 10 by y'y and the direction perpendicular to x'x and y'y by z'z, these three directions being orthogonal with respect to one another. The axes of rotation respectively of the part 9 and of the grinding wheel 10 are designated Dp and Dm.

In the conventional arrangement of FIGS. 1a and 1b, the axes Dp and Dm are parallel to the direction x'x and lie in a common plane parallel to the two directions x'x, y'y (this plane will be termed 'horizontal').

The surface to be machined of the part 9 is an annulus 13 situated in a plane perpendicular to the axis Dp. The working surface of the grinding wheel 10 is the peripheral zone 14 of the wheel lying opposite to the annulus 13. It is flat, circular, and its plane is perpendicular to the axis Dm of the grinding wheel.

The engagement of the grinding wheel 10 with the part 9 is such that the working surface 14 covers more than the part of the radius corresponding to the annulus 13 without touching the shaft 8.

During such machining, the grinding wheel 10 causes two series of symmetrically crossed traces 15 and 16 be produced on the annulus 13 of the part 9 (FIG. 4) resulting in a figure "in sun".

FIGS. 3a and 3b illustrate the arrangement in accordance with the invention enabling to effect grinding only of traces 16 in "half sun" (FIG. 5).

Figure 2A:
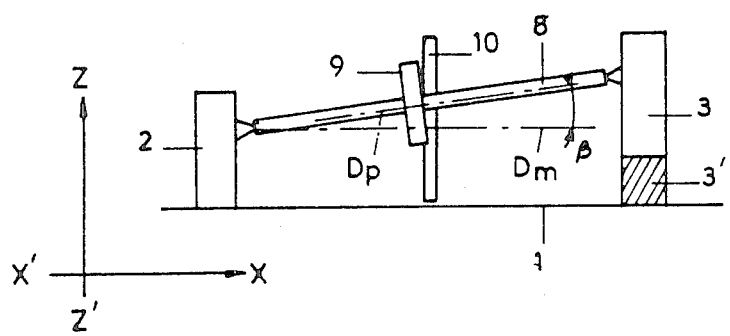
Figure 2B:
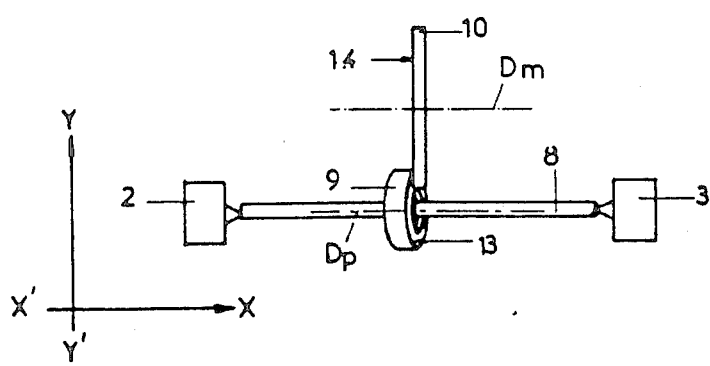

In order to progress from the arrangement of FIGS. 1a, 1b to that of FIGS. 3a, 3b, it is convenient to pass through the intermediate arrangement of FIGS. 2a, 2b, which are distinguished from the arrangement of FIGS. 1a, 1b in that the adjustable headstock 3 has been displaced vertically (here upwardly), by means of a block 3'. The part 9 is then inclined with respect to the vertical. The grinding wheel 10 is not moved. It thus attacks the lower part of the annulus 13. It is possible, as an alternative, to displace the headstock 3 downwardly: the grinding wheel will then attack the upper part of the annulus 13 leaving traces of the type illustrated at 15.

Orthogonal projections of the new axes Dp and Dm on the plane x'x, z'z define an angle $\beta$ (FIG. 2a) while their projections on the plane x'x,y'y remain parallel (FIG. 2b). It will be understood that if the machining takes place in this position, the relative inclination of the part and of the grinding wheel will give rise to traces of a single type termed "in half sun", but with a conical machine surface. The relative displacement which causes change over from the position of FIGS. 2a, 2b to that of FIGS. 3a, 3b has as its object to conserve substantially the flatness of the machine surface.

It should be noted that, in practice, angular displacements such as $\beta$ are not provided in known grinding machines. They are effected here by means of extremely thin wedges or blocks which are caused to slide between the table 1 of the grinding machine and the adjustable headstock 3, by one angle or by another of the base of the movable headstock according to the sense of displacement sought.

The arrangement of FIGS. 2a, 2b is converted to that of FIGS. 3a, 3b by a relative angular shifting of the grinding wheel 10 in a horizontal plane, such that orthogonal projections of the new axes Dp and Dm on the plane x'x,y'y now define an angle $\alpha$ (FIG. 3b) while their projections on the plane x'x,z'z maintain an angle $\beta$. It is again necessary to note that, in practice, contrary to that which has been illustrated here in order to facilitate understanding, it is the table of the grinding machine which is angularly shifted in its own plane as indicated by the arrow 4 and not the grinding wheel 10 of which the axis Dm is generally fixed.

The action of machining in this latter arrangement will be better understood with the aid of the diagrams of FIGS. 6 to 8 where the relative scale of the part and of the grinding wheel has been better observed than in FIGS. 1 to 3 (the radius of the grinding wheel is relatively large with respect to the radius of the part).

In FIG. 6, corresponding to FIGS. 1a, 1b, the surface to be machined is viewed from its face. It is a circular annulus 13 on centre P. The working surface 14 of the grinding wheel 10 is plane. Its plane intersects that of the annulus 13. The periphery of the wheel describes a large circle of centre M which intersects the annulus 13 at points A,B,C,D. The two centres P and M are on a common horizontal line. These are the conditions for machining termed "in sun": the chords A,B,C,D give rise respectively to traces 15 and 16 of FIG. 4.

In FIG. 7, the axis of the part 9 has been inclined downwardly (in contrast to FIGS. 2a, 2b where the inclination was upwardly) by several minutes. But for an observer moving with the member 9, it appears, as illustrated here, that it is the grinding wheel 10 which is inclined upwardly at the same time as its centre is raised from M to M'. M' is in fact very slightly to the rear of the plane of the annulus 13 which is also the plane of the diagram. MM' is perpendicular to PM. Under these conditions, the lateral surface 14 of the grinding wheel cuts the plane of the annulus 13 along a line E'F' parallel to PM and passing through N, such that MN=NM'.

The penetration of the grinding wheel is the greater as it is spaced from this line E'F' (according to the arrow upwardly as shown in FIG. 7) and, when the machining is completed, there remain only the traces 15 produced by the chord A'B', giving the "in half sun" appearance but conical as already indicated and due to the relative inclination of the grinding wheel upwardly which causes the point A' to penetrate more than the point B'.

In FIG. 8, corresponding to FIGS. 3a, 3b, the working surface 14 of the grinding wheel has pivoted relatively about its vertical diameter which is here represented by M'N in order to produce the second displacement and its lefthand part has penetrated a little bit further into the plane of the annulus 13 while its righthand part is disengaged.

The line of intersection of the two planes is thus displaced. The line, set upright again, extends from the horizontal line E'F'N to a line Δ which always passes through the fixed point N but becomes the closer to the vertical as the pivoting is increased.

The periphery of the working surface 14 of the grinding wheel "cuts" the annulus 13 at A",B",C",D". Its penetration into the plane of the annulus 13 is the greater as it becomes spaced from the upright line Δ towards the part 9 (as illustrated by the arrow towards the left). Although, when the machining is terminated, only the deeper traces 15 left by the chord A"B" remain, again giving the appearance "in half sun".

In order to avoid the conical aspect of the machining, relative pivoting of the grinding wheel by the necessary angle is effected such that the upright line Δ and the chord A"B" should become approximately parallel, that is to say up to the instant where the points A"B" are substantially at equality of penetration into the part, by an angle α approximating to ten times the angle β hereinbefore referred to.

Concretely, it can be verified that this condition is produced when, on approaching the part 9 by the grinding wheel 10 by translation of the table 1 of the grinding machine along the axis x'x, the tangent point of the working surface 14 on the annulus plane 13 lies in the middle of the chord A"B".

This method enables parts in which the penetration is the same at A" and B", and maximum, but very close, to the middle of the arc A"B". Because the grinding wheel has a relatively large diameter and because its inclination to the annulus surface is very slight, the chords A"B" define a central depression which is however very slight, and may be less than one μm, and the surface obtained can be considered as prefectly plane.

The adjustment such as hereinbefore described, is an optimum. It will be clear that the parts produced according to this method but with less precision again give good results but do not depart from the scope of the invention.

The inclination of the traces A"B" to the radius PB" is a function of the covering of the part/grinding wheel (thus of the distance PM). The sense of curvature of the subsisting trace is a function of the sense of inclination β of the shaft 8.

Other characteristics of subsisting traces are determined by various grinding parameters, well known to the man skilled in the art, such as the sense and the speed of rotation of the grinding wheel, those of the part, and the composition of the grinding wheel.

By way of example a roughness of 0.05 μm has produced with a velocity of rotation of the part of 100 rpm, the speed of cutting of the grinding wheel of 27 m/s (for a diameter of 305 mm) and finishing by a grinding wheel marketed under the name NORTON A320. A flatness better than two optical bands of a monochromatic interferometer using a wavelength of 0.6 μm has been produced in this example where the annulus is such that the interior and exterior diameters are respectively 40 and 60 mm.

In other words, the defect in true flatness provided is less than 0.6 μm. The angles of inclination used were of the order of 16 minutes for α and 2 minutes for β, produced by raising of the contra-point by 0.2 mm for a length between the points of approximately 300 mm. As a function of the geometrical parameters of the part 9 and of the result sought, various values can be placed on the machining parameters. The inclination of the traces defining the "impeller" of this micropump is selected as a function of the lubrication desired.

Figure 10A:
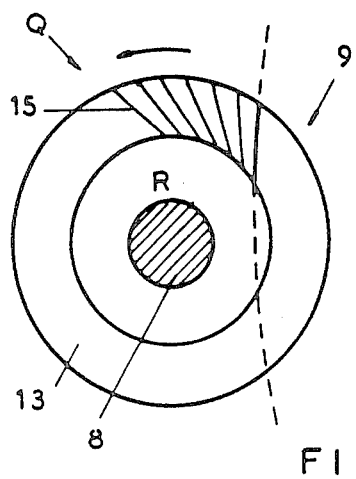
FIGS. 10a and 10b are views of the seal in the direction of the arrow X of FIG. 9 with the traces "in half sun" respectively seen in one direction and in the other.
Figure 10B:
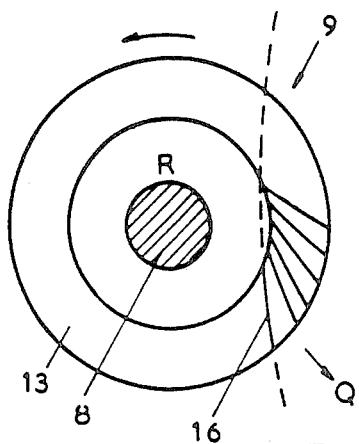
Figure 11A:
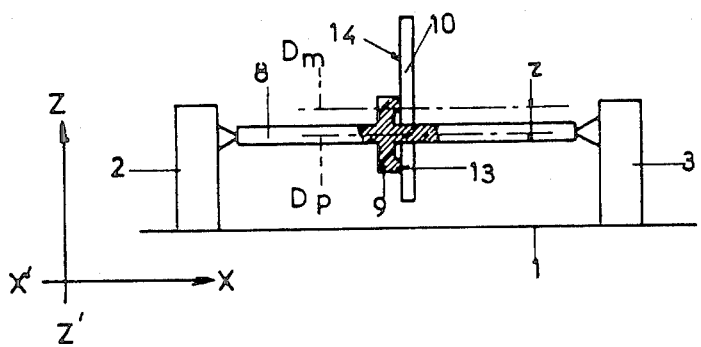
FIGS. 11a, 11b, 12a, 12b, 13 and 14 are diagrammatic views similar to those of FIGS. 2a, 2b, 3a, 3b, 7 and 8 and showing a modification of the method in accordance with the invention.
Figure 11B:
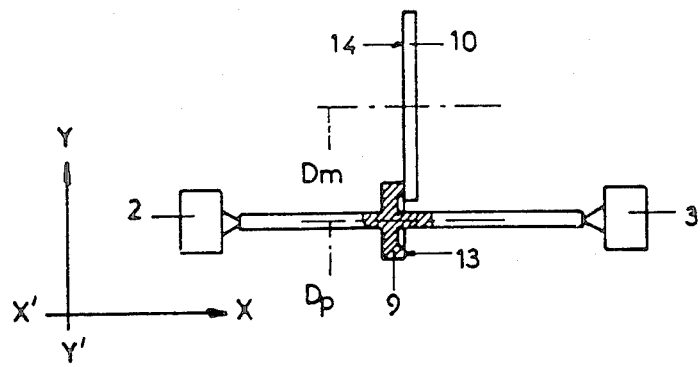
Figure 12A:
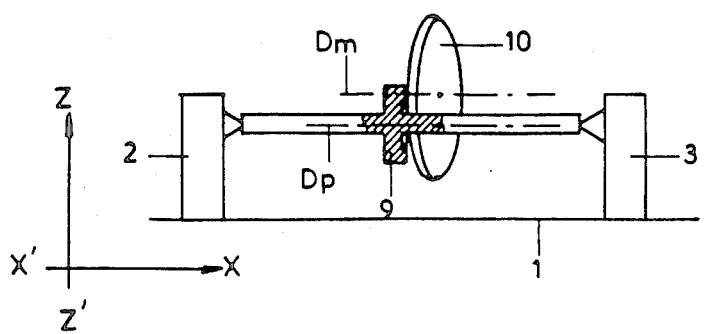
Figure 12B:
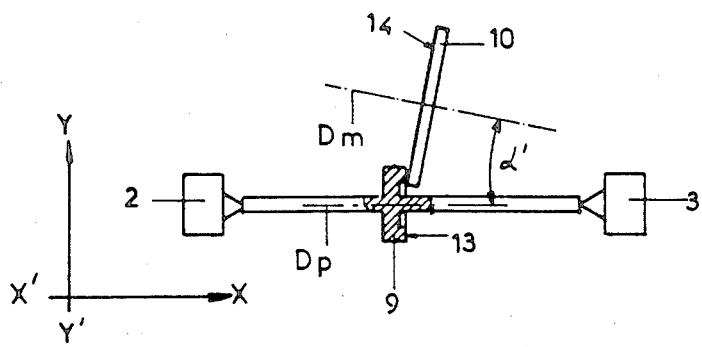
Figure 13:
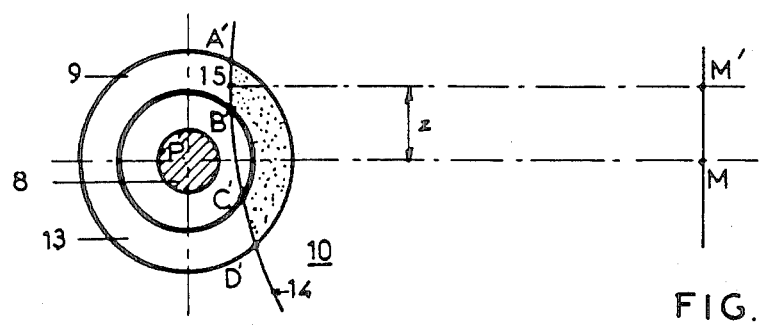
Figure 14:
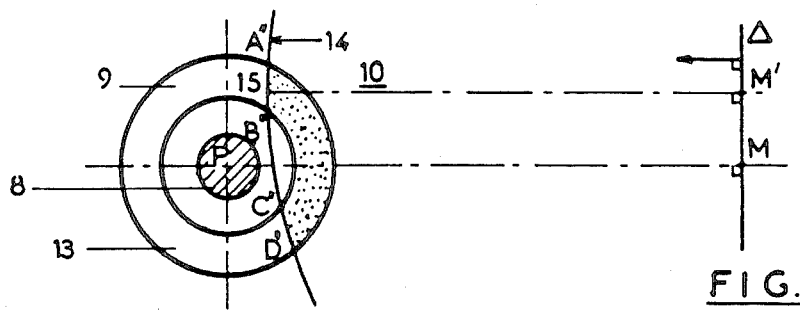

Referring now to FIGS. 9, 10a and 10b, the part 9 will be seen to be rigid with the rotary shaft 8 and cooperating with a fixed ring 18 in order to produce a fluid-tight thrust seal.

By assuming that a fluid pressure fluid R is exerted from the inside towards the outside of the seal, as illustrated in FIG. 9, the behaviour of the fluid will depend upon a given sense of rotation for the orientation of the traces "in half sun". For traces 16 inclined to the radius, from the inside to the outside, in the opposite sense to that of rotation (FIG. 10b), the flow of fluid outwardly is facilitated. For traces 15 inclined to the radius, from the inside to the outside, in the same sense as the sense of rotation (FIG. 10a), the flow of fluid outwardly is, on the contrary restrained or even reversed.

Opposite results are obtained if the pressure R is exerted from the outside of the seal towards the inside. FIGS. 11a, 11b, 12a, 12b, 13 and 14 illustrate a modification in the procedure in which the same relative dispositions of the annulus 13 and of the working surface 14 are provided by means of another arrangement of the part 9 and of the grinding wheel 10. This novel arrangement gives the same type of penetration of the working surface 14 into the annulus 13. It only differs from the preceding method by the operations to be carried out in order to obtain it and by the description which is derived from it. It is thus only concerned with an equivalent displacement to that already described and it does not depart from the scope of the invention.

As in the preceding description, the starting point is the traditional arrangement illustrated in FIGS. 1a, 1b and 6. One can change from these Figures to FIGS. 11a, 11b and 13 by a simple relative vertical motion z of the part 9, its axis Dp remaining parallel to the axis Dm of the grinding wheel 10. The part 9 is so placed that the center of the trace desired, here A'B', is in the horizontal plane containing the axis Dm of the grinding wheel 10 of which the trace M' becomes apparent in FIG. 13. From there, one changes to the arrangement FIGS. 12a, 12b and 14 by a relative rotation of the part 9 and of the grinding wheel 10, similar to the rotation through the angle α hereinbefore before referred to. The angle α' of this rotation is to be defined according to requirements but can be taken to be of the same order as α.

It has been ascertained that the intersection Δ of the plane of the working surface 14 with the plane of the annulus 13 is, in this novel arrangement, the upright line MM' which is always in the plane of the annulus surface 13 or the upright line parallel to MM', and thus that the penetration of the grinding wheel 10 into the annulus 13 increases in the sense of the arrow perpendicular to MM'. As a consequence, the trace A"B" will be deeper and will exist on its own, the center will be the deepest point of the trace but only at a very modest depth and an excellent flatness of the annulus 13 will be produced, as expected.

However, in practice, known grinding machines are not constructed to enable easily the vertical motion z of the part 9.

The terms "in sun" and "in half sun" as used herein are intended respectively to mean two series of intersecting line trace arrays which cross one another and a single series of line trace arrays which do not individually intersect other traces of the array.

What is claimed is:

1. A method of machining a rotary, plane, metallic seal comprising the steps of
   grinding a plane annulus of the seal by means of a plane, lateral working surface of a circular grinding wheel which working surface cuts the annulus along two chords,
   the working surface being inclined with respect to the annulus so that their planes intersect along a line substantially parallel to one of the selected two chords and that the maximum penetration by the working surface into the annulus is located substantially at the center of the said chord,
   the grinding effected at this location only producing traces termed herein as "in half sun" by the said one chord and imparting to the annulus the required flatness.

2. A method according to claim 1, wherein the orientation of the working surface in relation to the annulus is effected by taking the following steps
   (a) locating the annulus in the plane of the working surface of the grinding wheel
   (b) references including said plane and line joining the common diameters of the working surface and of the annulus in this position,
   (c) the annulus is displaced by rotation through a small angle about an axis parallel to the said reference line, and
   (d) the annulus is displaced in rotation through a second small angle about an axis parallel to the said reference plane and perpendicular to the reference line.

3. A method according to claim 2, wherein the annulus forming the seal is mounted on a shaft which shaft is initially mounted horizontally between a headstock and tailstock rigid with the table of a grinding machine, so that the axes of the annulus and of the grinding wheel are parallel to one another and in the same horizontal plane, the angular rotation being effected by adjusting the height of one of the headstock and the tailstock and the rotation through the second small angle by pivoting of the table of the grinding machine in its horizontal plane.

4. A method according to claim 2, wherein the first mentioned small angle is a few minutes and the second small angle is ten times as much.

5. A rotary plane, metallic seal comprising a circular part with an annulus ground to form a plane surface with traces formed by the grinding "in half sun" whereby to ensure in use the passage of lubricant between said annulus and a mating annulus surface.

6. A seal according to claim 5 where the mating annulus surface is formed on a ring and the lubricant is provided by the fluid of a pump of which the said surfaces form parts, the traces acting in the manner of a centrifugal pump.

* * * * *